US008035688B2

(12) United States Patent
Snyderman et al.

(10) Patent No.: US 8,035,688 B2
(45) Date of Patent: Oct. 11, 2011

(54) METHOD, SYSTEM AND APPARATUS FOR JOINTLY CALIBRATING COLOR DIGITAL CAMERAS AND MONITORS

(75) Inventors: David Snyderman, Brighton, NY (US); Geoffrey John Woolfe, Canadaigua, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 427 days.

(21) Appl. No.: 11/880,052

(22) Filed: Jul. 19, 2007

(65) Prior Publication Data
US 2009/0021587 A1    Jan. 22, 2009

(51) Int. Cl.
*H04N 17/00* (2006.01)

(52) U.S. Cl. ........ 348/187; 348/180; 348/181; 348/188; 348/190; 348/207.1; 348/268; 348/269

(58) Field of Classification Search ............. 348/207.11, 348/180, 181, 187, 188, 190, 268, 269
See application file for complete search history.

(56) References Cited

U.S. PATENT DOCUMENTS

| | | | |
|---|---|---|---|
| 6,784,995 | B2 | 8/2004 | Merle et al. |
| 6,816,262 | B1 | 11/2004 | Slocum et al. |
| 7,038,820 | B1 * | 5/2006 | Kindt et al. .................. 358/474 |
| 2003/0108337 | A1 * | 6/2003 | Tsuchida et al. ............. 386/95 |
| 2004/0027457 | A1 * | 2/2004 | Silverbrook et al. ...... 348/207.2 |
| 2005/0083346 | A1 * | 4/2005 | Takahashi et al. ........... 345/600 |
| 2005/0243317 | A1 * | 11/2005 | Baker et al. .................. 356/402 |
| 2005/0285017 | A1 * | 12/2005 | Tan et al. ................ 250/214 R |
| 2006/0078198 | A1 * | 4/2006 | Bawolek et al. ............. 382/167 |
| 2006/0126134 | A1 * | 6/2006 | Bala et al. ..................... 358/504 |
| 2006/0196950 | A1 * | 9/2006 | Kiliccote ..................... 235/494 |
| 2007/0052735 | A1 * | 3/2007 | Chou ........................... 345/690 |

FOREIGN PATENT DOCUMENTS
JP    2004056531 A  *  2/2004

OTHER PUBLICATIONS
Spyder2PRO Advertisement, © 2006 (2 pages).
"Digital Color Imaging Handbook", CRC Press LLC, Edited by Gaurav Sharma, Xerox Corporation, Webster, New York, Cover Page, Publication Data Page, pp. 269-384, © 2003.

* cited by examiner

*Primary Examiner* — Jason Chan
*Assistant Examiner* — Yih-Sien Kao
(74) *Attorney, Agent, or Firm* — Fay Sharpe LLP

(57) ABSTRACT

A computer program product and method for calibrating and characterizing a color display perform calibrating and characterizing steps. A light source is operated in order to emit light from one or more light emitters on the light source. A color capture device, e.g., a digital camera, is calibrated and characterized based on the emitted light. Then, color images are displayed on the color display and captured on the color capture device. The color display is calibrated and characterized based on the captured color images. Computer program instructions are recorded on the computer readable medium, and are executable by a processor, for performing the calibrating and characterizing steps. A method for generating a controlled light source includes displaying light source selections to a user and receiving a user light source selection. Selected light emitters produce a light output matching the user light source selection.

13 Claims, 5 Drawing Sheets

METHOD, SYSTEM AND APPARATUS FOR JOINTLY CALIBRATING COLOR DIGITAL CAMERAS AND MONITORS

BACKGROUND

Desktop imaging solutions are being increasingly used for both personal photography and to obtain image content for low-budget printed documents in small businesses. The typical desktop imaging environment consists of a digital camera, a computer, a color display device (CRT monitor or flat panel LCD) and image editing and organization software. Image and document editing tasks are often undertaken using the available monitor or display with little regard for its color accuracy or state of calibration. Unforeseen or unsatisfactory results can be obtained if the color monitor or display is poorly calibrated. Unfortunately, such failures are not noticed until the document is viewed on a different monitor or printed, by which time considerable editing effort may have been wasted. Calibrating and characterizing the color display can remedy these problems. The cost for hardware and software for such calibration is a significant expenditure for personal use or in a small business. Furthermore, the calibration system is a poor value proposition for many persons and organizations because it has no use beyond display calibration. Color display characterization is a process of deriving the relationship between digital input RGB values driving the display and the resulting colors emanating from the display as perceived by the human visual system. The latter is typically measured using instruments such as a calorimeter or spectroradiometer. Such instruments can be expensive, and require a certain level of skill on the part of the user.

An alternative is to replace costly color measurement instrumentation with an inexpensive consumer camera to measure displayed colors. However, since most digital cameras do not produce calorimetric data by default, they must themselves first be characterized. The standard camera characterization process once again requires color measurement instrumentation, and therefore does not reduce the cost or burden to the user.

Thus, there exists a need for a relatively low-cost, multipurpose system for calibration and characterization of both color displays and digital cameras.

INCORPORATION BY REFERENCE

The following references are incorporated herein in their entireties, by reference:

U.S. Pat. No. 6,784,995 issued Aug. 31, 2004, entitled "Colorimeter," by Merle, et al. discloses a colorimeter for measuring a color of light, including a color sensing device, a hanging means, and a means for reducing color distortion.

U.S. Pat. No. 6,816,262 issued Nov. 9, 2004, entitled "Colorimeter having field programmable gate array," by Slocum, et al. discloses a colorimeter capable of calibrating color monitors, whether having cathode ray tube or liquid crystal (LCD) displays, by a photometric array of photodetector and optical filter pairs.

DiCarlo, Jeffrey M., Glen Eric Montgomery and Steven W. Trovinger, "Emissive chart for imager calibration," *Proceedings of the 12th Color Imaging Conference: Color Science and Engineering*, Scottsdale, Ariz., USA, Nov. 9-12, 2004 discloses a calibration instrument (emissive calibration chart) based on emissive narrow-band light sources arranged in a grid pattern or chart configuration.

Digital Color Imaging Handbook, G. Sharma, Ed. Boca Raton, Fla.: CRC. 2003, ch. 5, "Device characterization," R. Bala discloses color device characterization according to a device-independent paradigm involving device transformations between device-dependent and calorimetric representations.

BRIEF DESCRIPTION

A method is provided for calibrating and characterizing a color display. A light source is operated in order to emit light from one or more light emitters on the light source. A color capture device, e.g., a digital camera, is calibrated and characterized based on the emitted light. Then, color images are displayed on the color display and captured on the color capture device. The color display is calibrated and characterized based on the captured color images.

A method is also provided for generating a controlled light source. A light source is provided, including a plurality of light emitters. Light source selections are displayed to a user on a display device, and a user light source selection is received. One or more of the light emitters and associated intensity level are selected such that the selected light emitters produce a light output matching the user light source selection as closely as possible when operated at the associated intensity levels. The selected light emitters are then operated at the associated intensity level.

A computer program product for calibrating and characterizing a color display is also provided. Computer program instructions are recorded on the computer readable medium, and are executable by a processor, for performing the following calibrating and characterizing steps. A light source is operated in order to emit light from one or more light emitters on the light source. A color capture device, e.g., a digital camera, is calibrated and characterized based on the emitted light. Then, color images are displayed on the color display and captured on the color capture device. The color display is calibrated and characterized based on the captured color images.

DETAILED DESCRIPTION

The present application describes a simple camera-based method for performing a color characterization of a display that does not require measurements from specialized instruments such as colorimeters and/or spectroradiometers. By modulating the relative intensities of the various LEDs on a light source, the light source is made to produce a wide range of color stimuli of known spectral composition and brightness. The system operates by first using the light source serving as a pre-calibrated emissive target to characterize a digital camera and then using the digital camera to characterize the color display. The software controls these characterization operations and computes the color management profiles for the devices.

Figure 1:
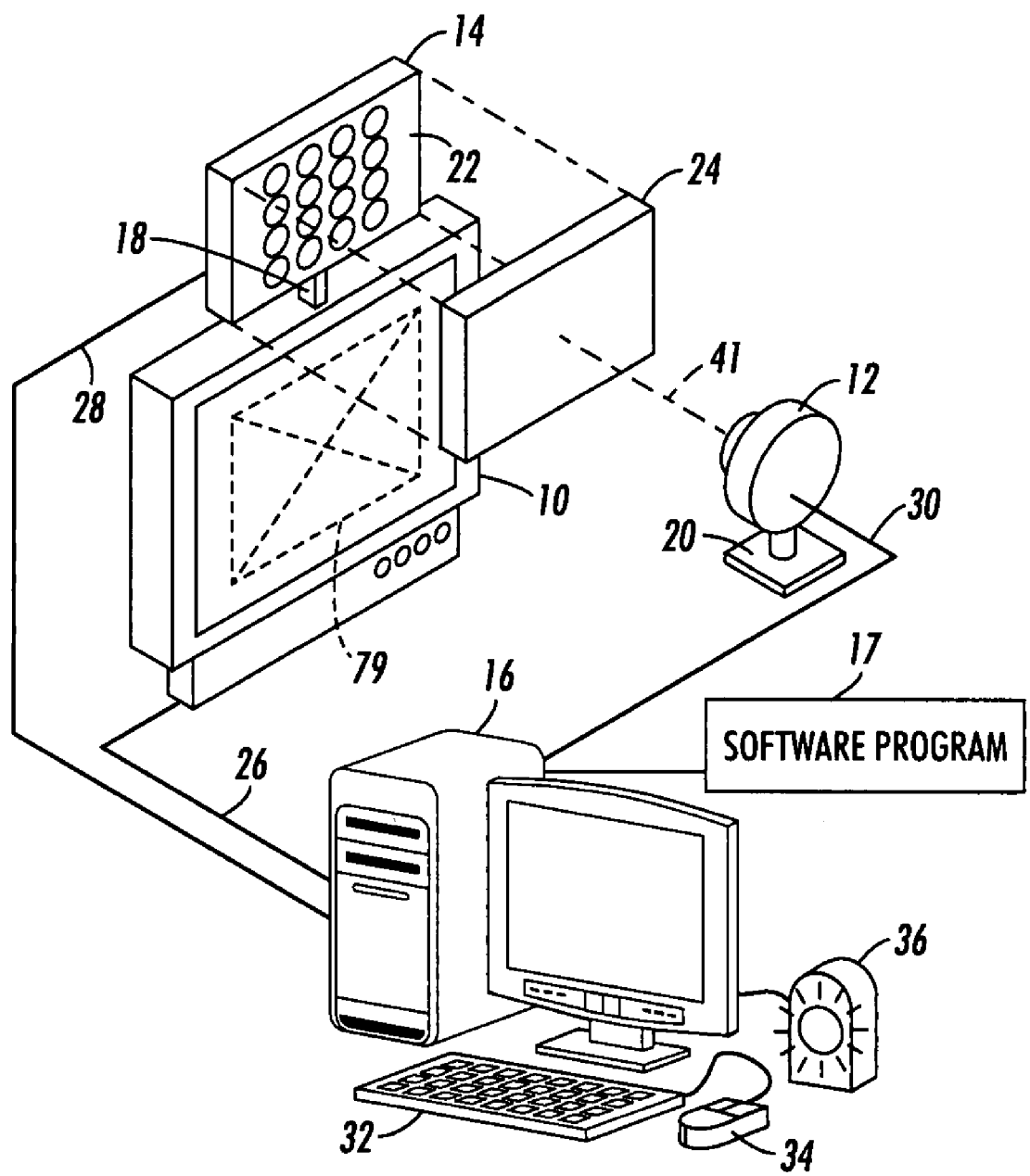
FIG. 1 is a computer system incorporating concepts of the present application.

With reference to FIG. 1, an exemplary apparatus is shown consisting of a color display 10, a digital camera 12 such as, e.g., a webcam (low resolution video) or a digital still camera, a light source 14 for characterizing the camera 12, a computer 16 running a software program 17 to control the characterization processes, and holding brackets 18, 20 for positioning of the light source 14 and the camera 12.

The light source 14 preferably houses multiple, colored, light emitting diodes (LEDs) 22, the brightness of which can be individually adjusted. Advantages of LEDs with respect to the present application include, but are not limited to: standardized light emitting characteristics, narrowband emission characteristics enabling them to be combined in a controlled fashion to produce a wide variety of selected spectral radiances, and ready availability as inexpensive commodity items. Table 1, for example, shows the capabilities of a small range of commercially available LEDs.

TABLE 1

Operating Characteristics of a Small Range of LEDs
OPT 0603 Super Bright Electro-Optical Characteristics

| | | | $V_F$ (V) | | $\lambda$ (nm) | | | $L_v$ (mcd) |
|---|---|---|---|---|---|---|---|---|
| Part Number | Lighting Color | Material | Typ | Max | $\lambda_D$ | $\lambda_P$ | $\Delta\lambda$ | Typ |
| OPT-0603UC640-140C | Red | AlGaInP | 1.90 | 2.40 | 631 | 640 | 23 | 75 |
| OPT-0603UC630-140C | Red | AlGaInP | 1.90 | 2.40 | 624 | 635 | 25 | 85 |
| OPT-0603UC620-140C | Orange | AlGaInP | 1.90 | 2.40 | 615 | 620 | 18 | 100 |
| OPT-0603UC610-140C | Amber | AlGaInP | 1.90 | 2.40 | 605 | 610 | 25 | 75 |
| OPT-0603UC590-140C | Yellow | AlGaInP | 2.00 | 2.50 | 588 | 590 | 32 | 85 |
| OPT-0603AE575-140C | Green | AlGaInP | 2.10 | 2.60 | 578 | 575 | 18 | 50 |
| OPT-0603MN525-140C | True Green | InGaN | 3.20 | 3.80 | 527 | 525 | 40 | 250 |
| OPT-0603MN505-140C | Turquoise | InGaN | 3.30 | 4.00 | 509 | 505 | 37 | 250 |
| OPT-0603CE470-140C | Blue | GaInN | 3.40 | 4.00 | 465 | 460 | 68 | 80 |
| OPT-0603CE430-140C | Blue | GaN/SiC | 4.00 | 4.50 | 465 | 430 | 60 | 8 |

The software program 17 controls the brightness of individual LEDs in order to generate color stimuli of various luminance and chromaticity. The color stimuli are used to characterize the digital camera. However, it is to be appreciated that although the present application describes the light source 14 as using LEDs, alternate light sources can be used with sufficient efficacy such as, e.g., phosphors, liquid crystals with filters, LEDs, or other.

In one embodiment of the light source 14, the light from the LEDs 22 is optically integrated or blended via a lens or diffuser system 24 to produce a composite stimulus. Although the lens or diffuser system 24 is shown as a separate component for clarity in the Figure, it is to be understood that the lens system is preferably an included feature of the light source 14. In a second embodiment, the light from each LED remains distinct from the remaining LEDs, much like an array of differently colored lights. An advantage of the first embodiment is that the light source 14 can be used to produce white light with a wide range of correlated color temperatures. This could be used, e.g., to calibrate the white-balance adjustment of the camera and hence to calibrate the correlated color temperature of the display 10. An advantage of the second embodiment of the light source 14, however, is that multiple stimuli can be captured by the camera in parallel, thus expediting the camera characterization process. To enable white point characterization, the second embodiment can be additionally equipped with a number of appropriately selected and filtered "white-light" LEDs as known in the art to allow one or several different white lights to be produced.

Whereas the light emitting diodes 22 of the light source 14 in embodiments of the present application are readily available commodity LEDs as described above, other known emissive targets described in the art such as, e.g., the emissive chart for imager calibration described by DiCarlo, Jeffrey M., Glen Eric Montgomery and Steven W. Trovinger, utilize specially designed LED-based emissive targets for general-purpose characterization of digital cameras. Further, the present application describes herein a method of using ordinary digital cameras for characterizing a display, i.e., the camera is characterized only to serve as a color measurement instrument. And, still further, the present application describes alternative uses for the light source beyond serving as a camera characterization target. For example, the light source 14 can be used as a keyboard light or a desk light when not in use for calibration purposes. Furthermore, because the light source 14 can provide a range of white light at different correlated color temperatures and with known spectral composition, it can be used for critical viewing tasks where controlled lighting is desirable.

As shown in the Figure, the display 10, the light source 14, and the camera 12 are directly connected to the computer 16 via links 26, 28 and 30 connected to appropriate communication ports on the computer 16, respectively, so that the software program 17 running on the computer 16 can control settings and operation of the attached devices. Suitable communications ports include, but are not limited to, various serial, parallel and wireless ports such as, e.g., USB, FireWire, Bluetooth and 802.11x. Each communication port sends control signals and data to and from the respective device and may also provide operating power to it. However, it is to be appreciated that a direct connection to the computer 16 is preferable, but not required, and any form of operative communication between the devices such as, e.g., wireless connection or network connection, will suffice for embodiments of the present application. In fact, with reference to the light source 14 and the camera 12, embodiments of the present application do not require any operative connection to the computer 16. For example, the software program 17 may instruct an operator via the display 10, or other output device, to manually make settings or perform specific operations of the camera 12 and/or the light source 14. The operator may then indicate completion of the instruction by means of an input device 32 such as a keyboard, or pointing device 34. Alternatively, if the display 10 is a "touch screen" type of device, the operator can indicate completion of an instruction via buttons or active areas shown on the display 10 in a menu or dialog box. Further, in alternate embodiments, the software program 17 may communicate instructions to the operator verbally or by other audible signals via an output sound device 36 such as, e.g., a speaker system. This feature would essentially eliminate the need for displaying menus and/or instructions on the display 10 during calibration and free it for other calibration purposes without limitation.

The software program 17 of the present application provides a number of functions including: providing control signals to the light source to produce different color stimuli, providing control signals to the camera to adjust camera settings, controlling the device characterization process for both the camera and the display device, and construction of color management profiles for the camera and the display device and installation of them into the operating system. As previously described, the control signals can be provided either automatically or manually by the operator as requested by the software component. It is to be appreciated that the software program 17 can be provided as a separate object on, e.g., a CD or DVD or other computer readable media which is then loaded into the computer 16, or it can be provided to the computer 16 by means of a network connection, running either remotely on a server or locally on the computer 16. It is to be further appreciated that the software program 17 can be programmed directly on the computer 16 by one or more programmers utilizing the input device 32 or a network connection to the computer 16.

As previously mentioned, the camera 12 can be, e.g., a video camera or a digital still camera and may even be supplied as part of a system including selected components as shown in the Figure. The camera should preferably, however, have the capability to operate with fixed exposure settings such as ISO speed, exposure compensation, shutter speed, aperture, and lens focal length. It is also preferable for the camera to be capable of being remotely controlled by the software program 17. The function of the camera in this system is essentially to act as a sensor for calibrating the computer display. A typical use case scenario involves using the light source 14 to calibrate and characterize the camera 12 and then using the camera 12 to calibrate and characterize the display 10. An alternative use case involves performing a simple calorimetric camera calibration for the purpose of subsequently calibrating the display. Both use cases are described below, as are use cases for simply using the light source as a source of illumination.

Figure 2:
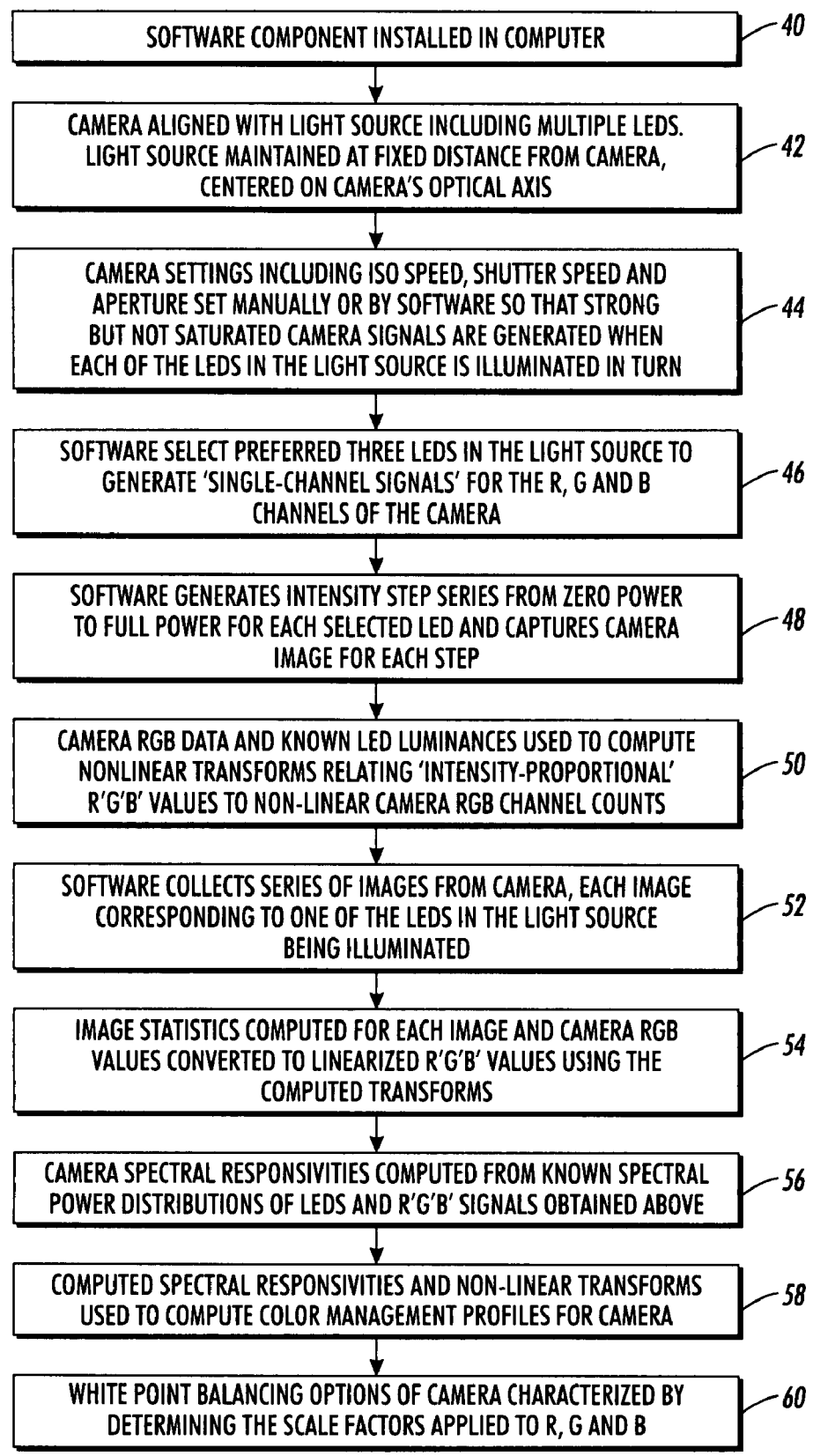
FIG. 2 is a flowchart showing a method for characterizing a digital camera according to concepts of the present application.

With reference now to FIG. 2 and continuing reference to FIG. 1, a flowchart is shown describing a method for characterizing the digital camera 12. At step 40 a user of the computer 16 installs or accesses the software program 17 for the purpose of characterizing the digital camera 12. At step 42, the camera 12 is aligned with the light source 14 at a fixed distance from the camera 12, preferably centered on the camera's optical axis as shown by numeral 41 in FIG. 1. In the embodiment shown, the camera 12 is placed in the bracket 20 which aligns it to the light source 14 which is also fixed in position by a second bracket 18. However, any means of fixing the distance between the camera 12 and the light source 14 can be utilized. The software program 17 sets camera settings at step 44 either automatically or by requesting that the user manually perform the camera settings. The camera settings preferably include ISO speed, shutter speed and aperture so that relatively strong but not saturated camera signals are generated when each of the LEDs 22 in the light source 14 are illuminated.

The software 17 then determines at step 46 which of the LEDs in the light source 14 can be used to generate the best "single-channel signals" for the R, G and B channels of the camera. The light source 14 includes in the LEDs 22 multiple LEDs of each color. Each LED is operated individually to find the best "single-channel signal" for each channel of the camera 12. Commodity cameras usually have a single-type sensor with a color filter over it. The object here is to determine which LED produces the largest signal in one channel and, correspondingly, the smallest in the remaining channels. For example, a suitable measure is the ratio such as R/G. Three LEDs are selected, one for each of the R, G and B channels. The software program 17 then, at step 48, generates an intensity step series from zero power to full power for each selected LED and captures a camera image for each step. At step 50, camera 12 RGB data from the captured images and the known LED luminances for the selected LEDs are used to compute transforms relating "intensity-proportional" R'G'B' values to camera RGB channel counts, for each channel using methods known in the art. While any suitable transform known in the art may be used, the camera RGB counts are normally nonlinear as are the computed transforms.

A series of images from the camera is collected by the software program 17 at step 52, each image corresponding to one of the narrow band LEDs 22 in the light source 14 being illuminated. The image statistics are computed at step 54 for each image, and the camera RGB values are converted to linearized R'G'B' values using the transforms computed above in step 50. The camera spectral responsivities are then computed at step 56 from the known spectral power distributions of the LEDs 22 and the R'G'B' signals obtained from step 54. After this, at step 58, the spectral responsivities from step 56 and the nonlinear transforms from step 50 are used by the software program 17 to compute color management profiles for the camera 12. Colors are classified according to the way humans perceive them with their visual system. Devices like cameras are designed to capture colors in a similar manner but are not exactly the same. Sometimes there are colors that a human can perceive as being different, but the camera records as being identical, and vice versa. The spectral response of the camera sensor is not normally identical to (or even a linear combination of) the spectral response of the human visual system. If the human visual system and the camera were linearly related, then they would have exactly the same ability to differentiate between colors at a certain level of intensity. Thus, the transform between the camera 12 RGB and tri-stimulus XYZ which are part of the camera 12 profile will normally be a nonlinear transform. The signals obtained from the camera 12 won't predict the colors seen by a human exactly, but since the object here is to characterize a display which is itself constrained by a limited number of light emitting sources, the camera 12 is not being used to capture the entire range of colors that can exist in the real world. It is being used eventually to capture a constrained set of spectral stimuli that come from the display 10. Thus, it is possible to characterize a priori the ensemble statistics of a class of spectra expected to emanate from a given display type, and to use this in conjunction with the camera 12 spectral sensitivities and color matching functions to generate a camera profile suitable for capturing the subject class of spectra.

As a final step 60, various white point balancing options of the camera 12 can be characterized if desired, by determining the scale factors applied to R, G and B.

Figure 3:
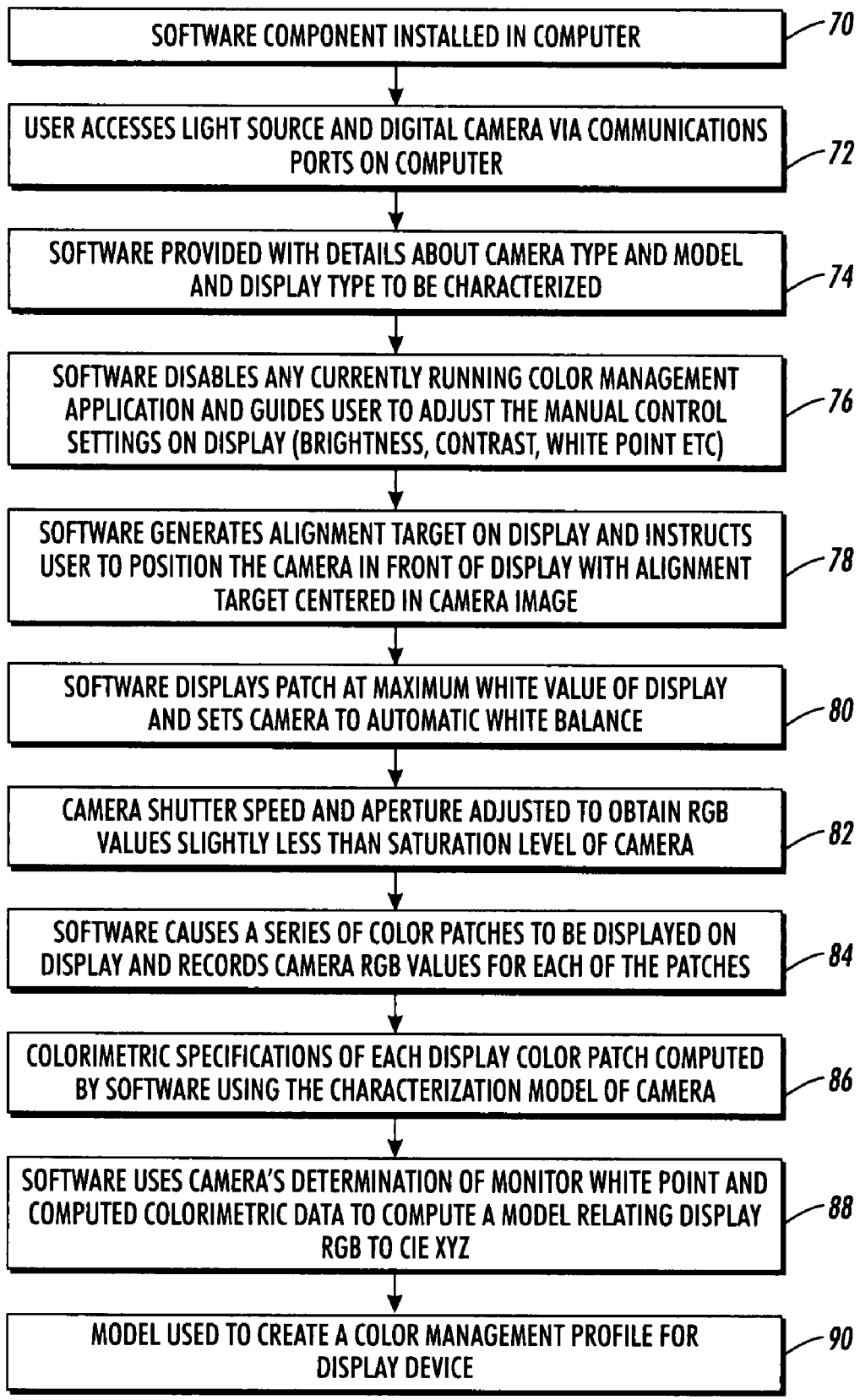
FIG. 3 is a flowchart showing a method for characterizing a display according to concepts of the present application.

Once the digital camera 12 has been characterized spectrally, or a characterized digital camera has been otherwise obtained, the digital camera 12 can be used to characterize the display 10. With reference now to FIG. 3, and continuing reference to FIG. 1, a flowchart is shown describing a method for characterizing the display 10. At step 70, if not previously done, the user of the computer 16 installs or accesses the software program 17 for the purpose of characterizing the display 10. The user then accesses the light source 14 and digital camera 12 at step 72 using appropriate communications ports on the computer 16 as previously described with reference to FIG. 1. The user configures the software program 17 at step 74 by providing details such as, e.g., the camera type and model and the display type to be characterized. In some embodiments, this occurs automatically for plug and play devices. The software program 17 preferably disables or requests disabling of any currently running color management application and then guides the user to adjust the manual control settings on the display 10 such as brightness, contrast, white point, etc.

The software program 17 next generates an alignment target on the display 10 at step 78 and instructs the user to position the camera 12 in front of the display 10, with the alignment target centered in the camera image, using a bracket provided for the purpose. An exemplary alignment target 79 is shown in FIG. 1, however, any alignment target providing a means of centering the display area of the display 10 in the camera image may be used. At step 80, the software program 17 displays a patch at the maximum white value of the display and sets the camera to an automatic white balance mode, or requests the user to set the camera 12 to automatic white balance mode. The camera shutter speed and aperture are then adjusted at step 82 to obtain RGB values slightly less than the saturation level of the camera 12, i.e., slightly less than 255 for an 8 bit RGB encoding such as, e.g., 250-254. A series of color patches are then displayed on the display 10 at step 84, and the software program 17 records the camera RGB values for each of the patches. The patches displayed preferably represent an effective sampling of the color gamut of the display 10. There should be sufficient sampling of the display gamut boundary colors to enable an accurate description of the gamut boundary to be determined. There should also be a sampling of the display 10 neutral axis (R=G=B) as well as ramps along each of the display 10 primaries (R,G,B) and their complements (C,M,Y) from both black to full color and white to full color. Color sampling inside the gamut should be comprehensive but may be biased toward certain specific memory colors.

The colorimetric specifications of each of the displayed color patches are computed by the software program 17 at step 86 using the characterization model (profile) of the camera 12. At step 88, the software program 17 uses the camera's determination of the display 10 white point from step 80 and calorimetric data computed in step 86 to compute a model relating display RGB to CIE XYZ using methods known in the art. This model is then used at step 90 to create a color management profile for the display 10. The above-described display characterization process offers an inexpensive and convenient process to characterize display devices which beneficially enables reliable softproofing and color editing capabilities.

Figure 4:
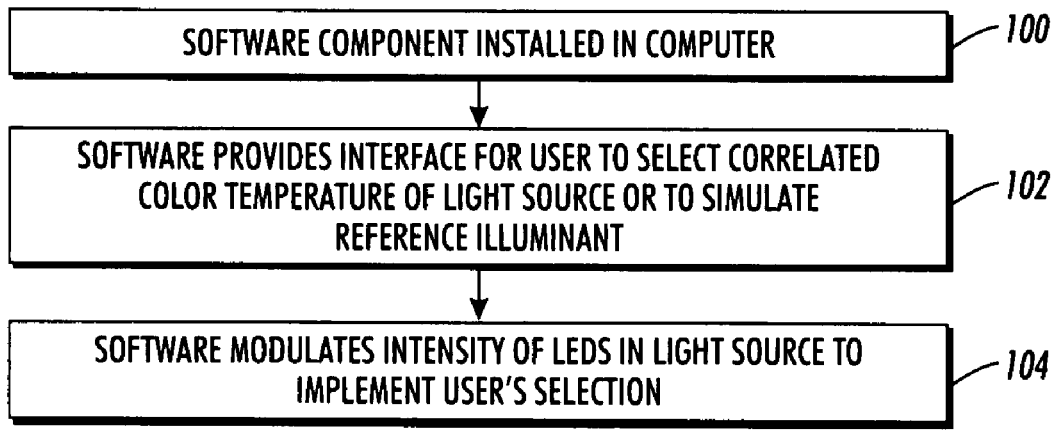
FIG. 4 is a flowchart describing using a light source as a calibrated illuminant according to concepts of the present application.

The procedure described with reference to FIGS. 2 and 3 provide methods for characterizing a digital camera and a color display respectively. However, the light source 14 described therein can be used for other purposes as well. For example, using the light source 14 as a calibrated illuminant offers more reliable proofing when viewing hardcopy proofs. With reference now to FIG. 4, and continuing reference to FIG. 1, a procedure is described for using the light source 14 as a calibrated illuminant. If not previously done, the user installs the software program 17 in the computer 16 at step 100. The software program 17 then displays an interface screen at step 102 for the user to select a correlated color temperature of the light source 14 or to simulate any of a number of standard reference illuminants. The interface screen can permit selection of the color temperature or reference illuminant by methods known in the art. For example, an array or matrix of color patches can be displayed for the user to select; the user may provide a color temperature or intensity; or the user may enter specific color values via the keyboard or pointing device. The software program 17 then, at step 104, modulates the intensity of the various LEDs in the light source to implement the user's selection. One benefit of using the light source 14 as a calibrated illuminant is that it offers more reliable proofing when viewing hardcopy proofs.

Figure 5:
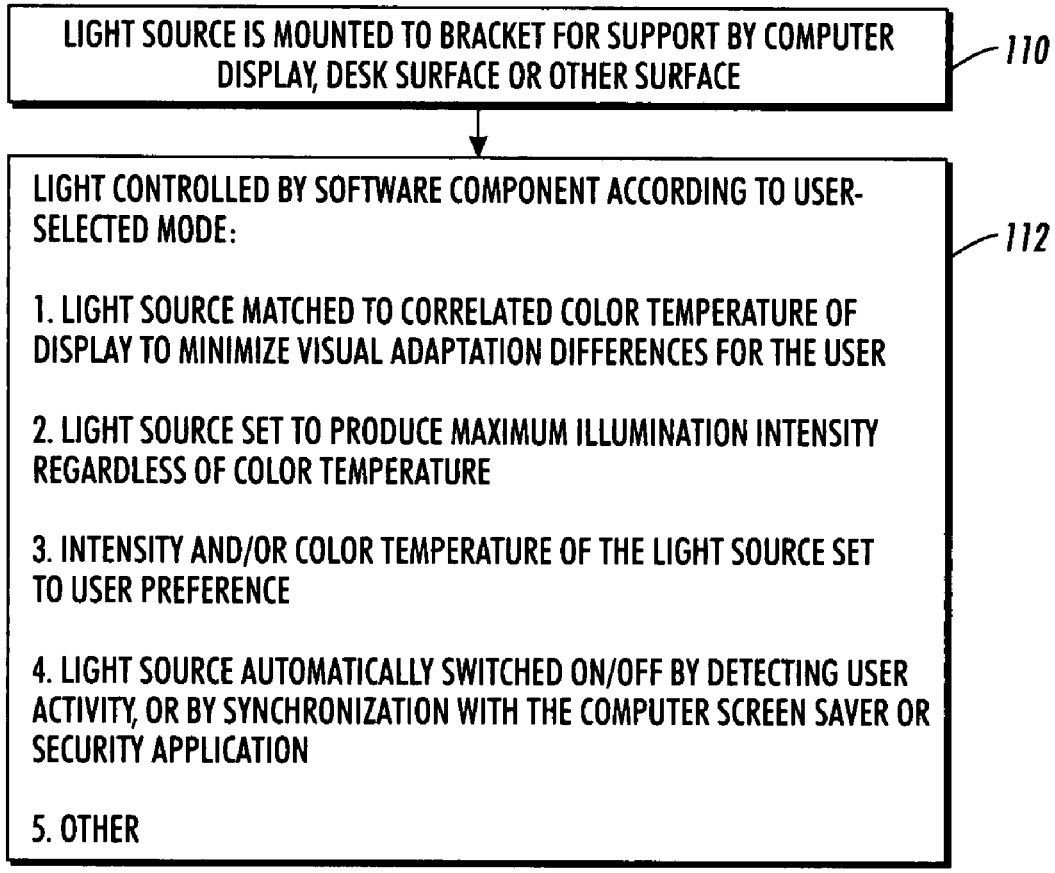
FIG. 5 is a flowchart describing using a light source as a general light source according to concepts of the present application.

In addition to using the light source 14 as a calibrated illuminant, with reference now to FIG. 5, and continuing reference to FIG. 1, a procedure is described for using the light source 14 as a general light source such as, e.g., a keyboard light or a desk light. Assuming the software program 17 has been previously installed, at step 110, the light source 14 is mounted to a bracket that allows it to be supported from the computer display 10 or supported on a desk surface. The bracket may be the bracket 18 previously discussed or may be a bracket specifically adapted to this purpose. The light source 14 is then controlled at step 112 by the software program 17 in one of several modes that might include, e.g., matching the light source 14 to the correlated color temperature of the display 10 to minimize visual adaptation differences for the user; setting the light source 14 to produce its maximum illumination intensity regardless of color temperature; setting the intensity and/or color temperature of the light source 14 to a preference of the user as selected through a user interface of the software program 17; or automatically switching the light on or off by detecting user activity such as, e.g., mouse or keyboard activity, or in synchronization with a computer screen saver or security application.

In one embodiment, the light source 14 and software program 17 are provided as a package to be used with an existing camera 12 owned by the user or purchaser. In alternate embodiments, a more complete package is provided, including the camera 12, for consumers who don't already own or have access to a digital camera.

Figure 6:
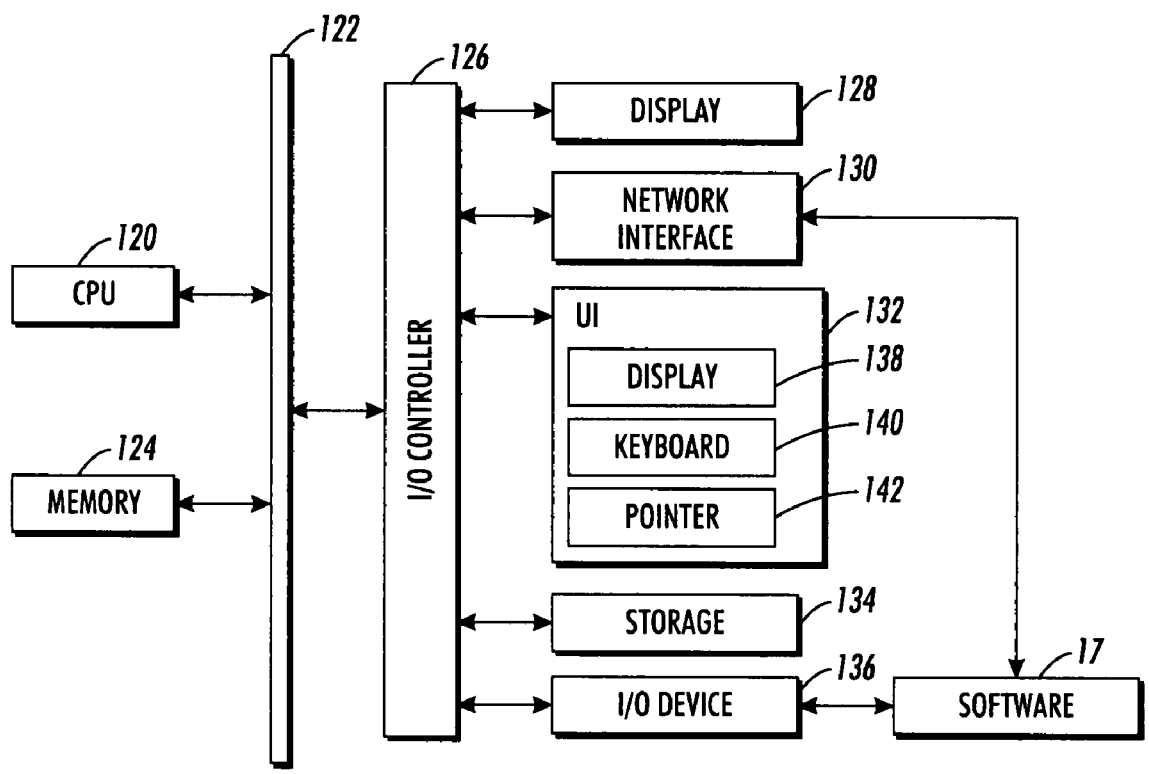
FIG. 6 is a block diagram showing a configuration of a system according to concepts of the present application.

With reference now to FIG. 6, a block diagram showing a configuration of a system according to an embodiment of the present application is provided. A central processing unit (CPU) 120 controls various elements of the system, particularly those attached to a system bus 122. A memory 124 is provided which preferably includes random access memory (RAM) and read-only memory (ROM). An I/O controller 126 performs the function of controlling the input and output of data to and from the memory 124 for devices attached to the I/O controller 126 such as, an auxiliary display 128, a network interface 130, a user interface 132, an external storage device 134, and an I/O device 136. The I/O controller 126 further sends control signals to and from the attached devices.

The user interface 132 preferably includes a user display 138 for the system to display, e.g., commands, software menus, and colorimetric information to the user. Although the system shown includes both an auxiliary display 128 and a user display 138, it is to be understood that the present application can be utilized for any display operatively connected to the system, and is not restricted to any particular display or number of displays. In fact, the system itself does not necessarily include any displays because, as known in the art, displays can be operatively connected to the system via the network interface 130. The software program 17 is shown as a separate object in the Figure for the reason that it is typically provided on media such as CD or DVD, or via the network interface 130 via a separate server system. It is to be understood that the software program 17 can be entered into the system via the I/O device 136, the network interface 130, by user programming via the user interface 132, or by any other means known in the art.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for calibrating and characterizing a color display, the method comprising:
   operating a light source including a plurality of light emitters to emit light, including:
      selecting light emitters in the light source determined as producing a largest signal for each of the RG and B channels of a color capture device; and
      generating a plurality of intensity steps by operating each selected light emitter at a plurality of intensities ranging from zero power to full power; and
   calibrating and characterizing the color capture device based on the emitted light, including:
      capturing each of the plurality of intensity steps by the color capture device;
      computing transforms relating intensity-proportional RGB channel values to camera RGB channel counts based on known luminances for the selected light emitters;
      collecting a plurality of images from the color capture device, each collected image corresponding to one of the selected light emitters in the light source being operated;
      computing image statistics for each collected image;
      converting capture device RGB values for each collected image to linearized R'G'B' values based on the computed transforms; and
      computing color capture device spectral responsivities from known spectral power distributions of the light emitters and the linearized R'G'B' values;
   displaying color images on the color display;
   capturing the displayed color images on the color capture device; and
   calibrating and characterizing the color display based on the captured color images.

2. The method set forth in claim 1, wherein:
   the step of operating a light source to emit light includes mixing the emitted light to produce a composite stimulus.

3. The method set forth in claim 1, wherein the color capture device comprises a digital camera.

4. The method set forth in claim 1, wherein the color capture device comprises a digital video camera.

5. The method set forth in claim 1, the step of characterizing the color capture device further including:
   computing color management profiles for the color capture device based on the computed color capture device spectral responsivities and the computed transforms.

6. The method set forth in claim 1, wherein:
   the step of displaying color images on the color display includes:
      displaying a white patch at a maximum white value of the color display; and
      adjusting a shutter speed and aperture setting of the color capture device to obtain white point RGB values slightly less than a saturation level of the color capture device; and
   the step of calibrating and characterizing the color display includes:
      displaying a plurality of color patches representing a sampling of a color gamut of the color capture device including gamut boundary colors;
      computing colorimetric specifications of each displayed color patch based on results of the step of calibrating and characterizing the color capture device; and
      computing a model relating display RGB values to CIE XYZ values based on the white point RGB values and the computed colorimetric specifications.

7. The method set forth in claim 6, wherein:
   the step of displaying a white patch at a maximum white value includes setting the color capture device to an automatic white balance mode.

8. The method set forth in claim 6, wherein:
   the step of displaying color images on the color display further includes:
      displaying an alignment target image on the color display; and
      positioning the color capture device in front of the color display with the alignment target image centered in the color capture device image.

9. A computer program product for calibrating and characterizing a color display comprising:
   a non-transitory computer readable medium;
   computer program instructions, recorded on the computer readable medium, executable by a processor, for performing the steps of:
      operating a light source including a plurality of light emitters to emit light,
      determining light emitters in the light source producing a largest signal for each of the RG and B channels of a color capture device; and
      generating a plurality of intensity steps by operating each selected light emitter at a plurality of intensities ranging from zero power to full power; and
      calibrating and characterizing the color capture device based on the emitted light, including:
         capturing each of the plurality of intensity steps by the color capture device;
         computing transforms relating intensity-proportional RGB channel values to camera RGB channel counts based on known luminances for the selected light emitters;
         collecting a plurality of images from the color capture device, each collected image corresponding to one of the selected light emitters in the light source being operated;
         computing image statistics for each collected image;
         converting capture device RGB values for each collected image to linearized R'G'B' values based on the computed transforms; and
         computing color capture device spectral responsivities from known spectral power distributions of the light emitters and the linearized R'G'B' values; and
      displaying color images on the color display;
      capturing the displayed color images on the color capture device; and
      calibrating and characterizing the color display based on the captured color images.

10. The computer program product set forth in claim 9, further comprising:
- a computer system for receiving user inputs, wherein the computer system houses the processor and is operatively connected to the light source for controlling operation of the plurality of light emitters, and operatively connected to the color display for controlling operation of the color display; and
- a lens or diffuser system for focusing or mixing the emitted light from the light source to produce a composite stimulus.

11. The computer program product set forth in claim 9, wherein the plurality of light emitters comprise a plurality of LEDs, and wherein the color capture device comprises at least one of a digital camera and a digital video camera.

12. The computer program product set forth in claim 9, wherein:
- the step of operating the light source includes:
  - selecting three light emitters in the light source and individually illuminating each one of the three light emitters; and
- the step of displaying color images on the color display includes:
  - displaying a white patch at a maximum white value of the color display; and
  - adjusting a shutter speed and aperture setting of the color capture device to obtain white point RGB values slightly less than a saturation level of the color capture device; and
- the step of calibrating and characterizing the color display includes:
  - displaying a plurality of color patches representing a sampling of a color gamut of the color capture device including gamut boundary colors;
  - computing colorimetric specifications of each displayed color patch based on results of the step of calibrating and characterizing the color display; and
  - computing a model relating display RGB values to CIE XYZ values based on the white point RGB values and the computed colorimetric specifications.

13. The computer program product set forth in claim 12, wherein:
- the step of characterizing the color capture device further includes:
- computing color management profiles for the color capture device based on the computed color capture device spectral responsivities and the computed transforms;
- the step of displaying a white patch at a maximum white value includes setting the color display to an automatic white balance mode; and
- the step of displaying color images on the color display further includes:
  - displaying an alignment target image on the color display; and
  - positioning the color capture device in front of the color display with the alignment target image centered in the color capture device image.

* * * * *